US012354463B2

(12) United States Patent
Jackson et al.

(10) Patent No.: US 12,354,463 B2
(45) Date of Patent: Jul. 8, 2025

(54) USE OF DATA FROM A DOORBELL WITH INTEGRATED SENSORS

(71) Applicant: Alarm.com Incorporated, Tysons, VA (US)

(72) Inventors: Kelly Franklin Jackson, Arlington, VA (US); Daniel Todd Kerzner, McLean, VA (US); Benjamin Asher Berg, Washington, DC (US)

(73) Assignee: Alarm.com Incorporated, Tysons, VA (US)

(*) Notice: Subject to any disclaimer, the term of this patent is extended or adjusted under 35 U.S.C. 154(b) by 0 days.

(21) Appl. No.: 17/703,024

(22) Filed: Mar. 24, 2022

(65) Prior Publication Data

US 2022/0215725 A1 Jul. 7, 2022

Related U.S. Application Data

(63) Continuation of application No. 15/428,576, filed on Feb. 9, 2017, now Pat. No. 11,315,394.

(60) Provisional application No. 62/293,359, filed on Feb. 10, 2016.

(51) Int. Cl.

*G08B 3/10* (2006.01)
*G08B 13/02* (2006.01)
*G08B 13/18* (2006.01)
*G08B 13/196* (2006.01)

(52) U.S. Cl.

CPC ............... *G08B 3/10* (2013.01); *G08B 13/02* (2013.01); *G08B 13/18* (2013.01); *G08B 13/196* (2013.01)

(58) Field of Classification Search

CPC .......... G08B 3/10; G08B 13/02; G08B 13/18; G08B 13/196

See application file for complete search history.

(56) References Cited

U.S. PATENT DOCUMENTS 5,570,083 A 10/1996 Johnson
5,673,016 A 9/1997 Lutes
6,218,938 B1 4/2001 Lin
8,154,391 B1 4/2012 Morris
8,786,425 B1 7/2014 Hutz
10,289,917 B1 * 5/2019 Fu .................... G08B 13/19602
2003/0179096 A1 9/2003 Hanan
2005/0007451 A1 1/2005 Chiang
2010/0148957 A1 6/2010 Ortiz et al.
(Continued)

*Primary Examiner* — Omer S Khan

(74) *Attorney, Agent, or Firm* — Fish & Richardson P.C.

(57) ABSTRACT

Methods, systems, and apparatus, including computer programs encoded on a computer storage medium, for implementing an integrated doorbell device are disclosed. In one aspect, a method includes the actions of receiving doorbell data indicating activation of a doorbell of a property. The actions further include receiving device data from one or more devices associated with a monitoring system within the property. The actions further include determining a security status associated with the monitoring system. The actions further include based on the doorbell data indicating activation of the doorbell of the property, the device data from the one or more devices associated with the monitoring system, and the security status associated with the monitoring system, determining a response action for execution by the monitoring system. The actions further include performing, by the monitoring system, the response action.

20 Claims, 4 Drawing Sheets

(56) References Cited

U.S. PATENT DOCUMENTS

| | | | | |
|---|---|---|---|---|
| 2010/0289618 | A1* | 11/2010 | Crucs | G08C 17/00 340/5.71 |
| 2010/0289644 | A1* | 11/2010 | Slavin | G08B 13/2402 340/568.1 |
| 2011/0148653 | A1 | 6/2011 | Lin et al. | |
| 2013/0274899 | A1* | 10/2013 | Hamzaoui | G05B 23/0281 700/81 |
| 2015/0163412 | A1 | 6/2015 | Holley et al. | |
| 2015/0332171 | A1* | 11/2015 | Nakagawa | G06N 5/025 706/14 |
| 2015/0341603 | A1* | 11/2015 | Kasmir | H04N 5/33 340/584 |
| 2015/0347910 | A1* | 12/2015 | Fadell | H04L 12/2825 706/46 |
| 2016/0379458 | A1 | 12/2016 | Eyring et al. | |
| 2018/0018508 | A1* | 1/2018 | Tusch | G06V 20/52 |

* cited by examiner

200

210

DOORBELL ACTION REPOSITORY

| SCENARIO | OCCUPANCY INFORMATION | DOORBELL INFORMATION | SECURITY STATUS | DOORBELL ACTION |
|---|---|---|---|---|
| A | NO OCCUPANTS WITHIN PROPERTY | DOORBELL RUNG | ARMED | PROVIDE REMOTE NOTIFICATION ONLY TO HUSBAND |
| B | CHILD AND WIFE WITHIN PROPERTY; HUSBAND OUTSIDE PROPERTY | DOORBELL RUNG | ARMED | PROVIDE NOTIFICATION TO WIFE ONLY USING DEVICES INSIDE PROPERTY |
| C | ONLY CHILD WITHIN PROPERTY | DOORBELL RUNG | ARMED | PROVIDE REMOTE NOTIFICATION TO BOTH WIFE AND HUSBAND |
| D | NO OCCUPANTS WITHIN PROPERTY | DOORBELL RUNG AND NOT OPENED; SUBSEQUENT MOTION DETECTED | ARMED | (1) TRIGGER ALARM NOTIFICATION AT PROPERTY; (2) TRANSMIT REMOTE NOTIFICATION TO HUSBAND AND WIFE |

FIG. 2

USE OF DATA FROM A DOORBELL WITH INTEGRATED SENSORS

CROSS-REFERENCE TO RELATED APPLICATIONS

This application is a continuation of U.S. patent application Ser. No. 15/428,576, filed Feb. 9, 2017, now allowed, which claims the benefit of U.S. Patent Application No. 62/293,359, filed on Feb. 10, 2016. The disclosure of each of the foregoing applications is incorporated herein by reference.

TECHNICAL FIELD

This disclosure relates to home monitoring technology.

BACKGROUND

The operation of connected devices within a property can be integrated to improve monitoring of the property. For example, data gathered by the connected devices can be aggregated to determine when people are present in the property.

SUMMARY

Techniques are described for using integrated devices within a property to perform specific actions in response to detecting a doorbell activation near the exterior of the property. In response to detecting a doorbell activation, a monitoring system may aggregate data collected by the integrated devices in order to determine occupancy and security information associated with the property. The monitoring system can then perform specific actions related to the occupancy and security information. For example, in response to detecting aberrant motion outside the property after a doorbell activation and that a vulnerable individual (e.g., a child) is presently inside the property, the monitoring system can transmit a notification indicating a potential intruder outside the property and that the vulnerable individual is in the property. In this regard, data indicating actions associated with doorbell actions of a property can be aggregated with data gathered from integrated devices within the property to intelligently transmit notifications or alerts communicating the present condition of the property to a remote user to the appropriate individuals.

According to an innovative aspect of the subject matter described in this application, a method for implementing an integrated doorbell device includes the actions of receiving doorbell data indicating activation of a doorbell of a property; receiving device data from one or more devices associated with a monitoring system within the property; determining a security status associated with the monitoring system; based on the doorbell data indicating activation of the doorbell of the property, the device data from the one or more devices associated with the monitoring system, and the security status associated with the monitoring system, determining a response action for execution by the monitoring system; and performing, by the monitoring system, the response action.

These and other implementations can each optionally include one or more of the following features. The action of receiving device data from one or more devices associated with a monitoring system within the property includes receiving camera data from one or more cameras located within the property; receiving motion sensor data from one or more motion sensors located within the property; receiving thermal sensor data from one or more thermal sensors located within the property; receiving device location data from one or more network access points located within the property; and receiving appliance data from one or more appliances located within the property. The security status is armed, unarmed, emergency, or alarm. The device data from the one or more devices indicates that no residents of the property are located inside the property. The security status is armed. The response action comprises notifying a predetermined one of the residents of the property.

The device data from the one or more devices indicates that one or more residents of the property are located inside the property. The security status is armed. The response action comprises notifying the one or more residents of the property. The device data from the one or more devices indicates that a child resident of the property are located inside the property and that no adult residents of the property are located inside the property. The security status is armed. The response action comprises notifying one or more adult residents of the property. The device data from the one or more devices indicates that no residents of the property are located inside the property and that motion is detected within the property. The security status is armed. The response action comprises notifying one or more residents of the property and updating the security status to alarm. The device data from the one or more devices indicates that one or more residents of the property are located inside the property. The security status is unarmed. The response action comprises logging the doorbell data, the device data, and the security status. The response action includes transmitting, to a user device and for display on the user device, the doorbell data, video data associated with an area surrounding the doorbell, and the device data.

Other embodiments of this aspect include corresponding systems, apparatus, and computer programs recorded on computer storage devices, each configured to perform the operations of the methods.

The subject matter described in this application may have one or more of the following advantages. Property owners may be alerted upon activation of their doorbell. The alert may include a status of the occupants of the property and video footage of the area around the doorbell. The doorbell may integrate with a monitoring system such that the monitoring system may capture sensor data from the monitoring system when the doorbell is activated.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2 illustrates a diagram of an example of a doorbell action repository.

DETAILED DESCRIPTION

Figure 1:
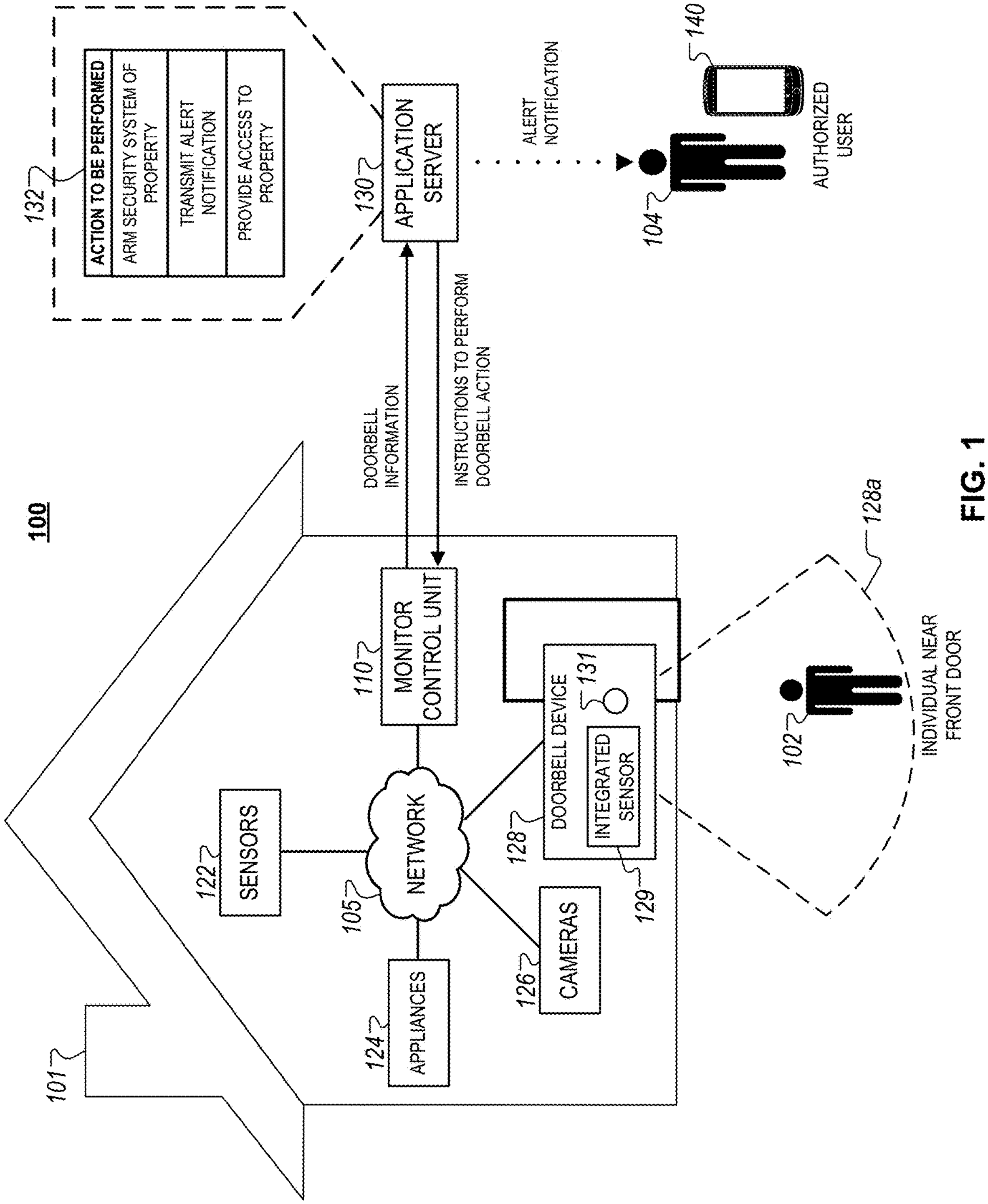
FIG. 1 illustrates a diagram of an example of a system.

FIG. 1 illustrates a diagram of an example of a monitoring system 100 associated with a property 101. The system 100 may include a monitor control unit 110, sensors 122, appliances 124, cameras 126, a doorbell device 128, and an application server 130 connected over a network 105. The application server 130 additionally includes a doorbell action repository 132. In some implementations, the application server 130 also exchanges communications with a user device 140 associated with an authorized user 104 of the property 101.

In general, the system 100 can be configured to respond to a doorbell activation by an individual 102 based on monitoring an exterior region 128*a* of the property 101 and determining an appropriate action to be performed in response based on one or more actions specified by the doorbell action repository 132. In the example depicted in FIG. 1, the doorbell device 128 initially detects a doorbell activation by the individual 102. In response to detecting the doorbell activation, the doorbell device 128 transmits a signal including information about the activation to the monitor control unit 110 or the application server 130. Subsequently the doorbell device monitors the exterior region 128*a*, near the front door of the property 101, for motion by the individual 102. The doorbell device 128 then transmits a signal including doorbell information (e.g., timestamp of doorbell activation, detected motion within the exterior region 128*a*, captured footage of the individual 102, etc.) to the monitor control unit 110 or the application server. In response, the monitor control unit 110 may gather additional information for the property 201 from the sensors 122, the appliances 124, and the cameras 126, and then transmit the gathered data to the application server 130. After receiving the gathered data, the application server 130 accesses the doorbell action repository 132 to determine an appropriate action to be performed based on the information included within the gathered data. After determining an appropriate action to be performed, the application server 130 transmits instructions to perform the action to be performed to the cameras 126, the doorbell device 128, or the monitor control unit 110, which then transmits corresponding signals to one or more of the sensors 122, the appliances 124, the cameras 126, or the doorbell device 128. In some instances, the action to be performed may include transmitting a doorbell alert notification indicating the detected doorbell press and other associated information to the user device 140*a* of the authorized user 104. More particular descriptions related to the components of the system 100 are provided below.

The network 105 is configured to enable exchange of electronic communications between devices connected to the network 105. For example, the network 105 may be configured to enable exchange of electronic communications between the monitor control unit 110, the sensors 122, the appliances 124, the cameras 126, the doorbell device 128 and the application server 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller and a network module. The controller is configured to control a monitoring system (e.g., a home alarm or security system) that includes the monitor control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitor control unit 110.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitor control unit 110 to communicate over a local area network and/or the Internet. The network module also may be a voice-band modem configured to enable the alarm panel to communicate over the telephone lines of Plain Old Telephone Systems (POTS).

In some examples, the monitor control unit 110 may include data capture and recording devices. In these examples, the monitor control unit 110 may include one or more cameras 126, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitor control unit 110 also may include a communication module that enables the monitor control unit 110 to communicate other devices of the system 100. The communication module may be a wireless communication module that allows the monitor control unit 110 to communicate wirelessly. For instance, the communication module may be a Wi-Fi module that enables the monitor control unit 110 to communicate over a local wireless network at the property 101. The communication module further may be a 900 MHz wireless communication module that enables the monitor control unit 110 to communicate directly with a monitor control unit. Other types of short-range wireless communication protocols, such as Bluetooth, Bluetooth LE, Zwave, ZigBee, etc., may be used to allow the monitor control unit 110 to communicate with other devices in the property 101.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

The monitor control unit 110 may exchange communications with the sensors 122, the appliances 124, the cameras 126, the doorbell device 128, and the application server 130 using multiple communication links. The multiple communication links may be a wired or wireless data pathway configured to transmit signals from sensors 122, the appliances 124, the cameras 126, the doorbell device 128, and the application server 130 to the controller. The sensors 122, the appliances 124, the cameras 126, the doorbell device 128, and the application server 130 may continuously transmit sensed values to the controller, periodically transmit sensed values to the monitor control unit 110, or transmit sensed values to the monitor control unit 110 in response to a change in a sensed value.

The multiple communication links may include a local network. The sensors 122, the appliances 124, the cameras 126, the doorbell device 128, and the application server 130 and the monitor control unit 110 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the monitor control unit 110 may additionally be used to perform routine surveillance operations on a property. For instance, the monitor control unit 110 may be assigned to one or more particular properties within a geographic location and may routinely collect surveillance footage during specified time periods (e.g., after dark), which may then be transmitted to the application server 130 for transmitting back to each particular property owner. In such implementations, the property owner may receive the surveillance footage over the network 105 as a part of a service provided by a security provider that operates the application server 130. For example, transmissions of the surveillance footage collected by the monitor control unit 110 may be part of a premium security service package provided by a security provider in addition to the routine drone emergency response service.

In some implementations, the monitor control unit 110 may monitor the operation of the electronic devices of the system 100 such as sensors 122, the appliances 124, the cameras 126, the doorbell device 128, and the application server 130. For instance, the monitor control unit 110 may enable or disable the devices of the system 100 based on a set of rules associated with energy consumption, user-specified settings, and/or other information associated with the conditions near or within the property 101 where the system 100 is located. In some examples, the monitor control unit 110 may be used as a replacement to a traditional security panel (or monitor control unit) that is used to monitor and control the operations of the system 100. In other examples, the monitor control unit 110 may coordinate monitoring operations with a separate security panel of the system 100. In such examples, the monitor control unit 110 may monitor particular activities of the devices of the system 100 that are not monitored by the security panel, or monitor the operation of particular devices that are not monitoring by the security panel.

The system 100 also includes one or more sensors or detectors. For example, the monitoring system may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The appliances 124 may be home or commercial automation devices connected to the network 105 that are configured to exchange electronic communications with other devices of the system 100. The appliances 124 may include, for example, connected kitchen appliances, controllable light sources, safety and security devices, energy management devices, locks, access control card readers, and/or other types of electronic devices capable of exchanging electronic communications over the network 105. In some instances, the appliances 124 may periodically transmit information and/or generated data to the monitor control unit 110 such that the monitor control unit 110 can automatically control the operation of the appliances 124 based on the exchanged communications. For example, the monitor control unit 110 may operate one or more of the appliances 124 based on a fixed schedule specified by the user. In another example, the monitor control unit 110 may enable or disable one or more of the appliances 124 based on received sensor data from the sensors 122.

The cameras 126 may be video/photographic cameras or other type of optical sensing devices configured to capture images. For instance, the cameras 126 may be configured to capture images of an area within a building monitored by the monitor control unit 110. The cameras 126 may be configured to capture single, static images of the area and also video images of the area in which multiple images of the area are captured at a relatively high frequency (e.g., thirty images per second). The cameras 126 may be controlled based on commands received from the monitor control unit 110 or the application server 130.

The cameras 126 may be triggered by several different types of techniques. For instance, a Passive Infra Red (PIR) motion sensor may be built into the cameras 126 and used to trigger the cameras 126 to capture one or more images when motion is detected. The cameras 126 also may include a microwave motion sensor built into the camera and used to trigger the cameras 126 to capture one or more images when motion is detected. The cameras 126 may have a "normally open" or "normally closed" digital input that can trigger capture of one or more images when external sensors (e.g., the sensors 122, PIR, door/window, etc.) detect motion or other events. In some implementations, the cameras 126 receives a command to capture an image when external devices detect motion or another potential alarm event. The cameras 126 may receive the command from the controller or directly from one of the sensors 122.

In some examples, the cameras 126 trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras 126 may be programmed with any combination of time/day schedules, system "arming state", or other variables to determine whether images should be captured or not when triggers occur. The cameras 126 may enter a low-power mode when not capturing images. In this case, the cameras 126 may wake periodically to check for inbound messages from the controller. The cameras 126 may be powered by internal, replaceable batteries if located remotely from the monitoring control unit 110. The cameras 126 may employ a small solar cell to recharge the battery when light is available. Alternatively, the cameras 126 may be powered by the controller's 112 power supply if the cameras 126 is co-located with the controller.

In some implementations, the cameras 126 communicates directly with the application server 130 over the Internet. In these implementations, image data captured by the cameras 126 does not pass through the monitor control unit 110 and the cameras 126 receives commands related to operation directly from the application server 130.

The doorbell device 128 may be an electronic computing device that is placed on the exterior of the property 101 and configured to capture video and image footage of the exterior region 128*a* of the property 101. In some implementations, the doorbell device 128 can be a connected device placed on the front door of the property 101 that is capable of receiving a button press from an individual near the front door (e.g., the individual 102). In such implementations, the doorbell device 128 may be configured to exchange communications with a separate security camera that captures footage of the front exterior of the property 101. Alternatively, in other implementations, the doorbell device 128 may include one or more integrated sensors 129 such as camera devices that are integrated with the doorbell device 128 and are capable of collecting footage of the exterior region 128*a*. The integrated sensors 129 may also be capable of detecting motion within the exterior region 128*a* such that, after initially detecting a doorbell press, the doorbell device 128 can correlate a doorbell press detection event and subsequent motion detected within the exterior region 128*a* in order to identify possible security risks to the property 101.

The doorbell device can be activated by any of its component sensors 129, as configured by the authorized user 104 using the system 101. In some implementations, the doorbell device 128 may be activated by pushing a button 131 that is located on the device. The doorbell device 128 may also be activated through the detection of motion, an object generally, or a specific object in a video stream from an embedded camera, or using a passive infrared (PIR) sensor. Additionally, the application server 130 or the monitor control device 110 may send a message indicating that the doorbell device 128 should activate immediately. For example, the doorbell device 128 may detect motion and provide data indicating the motion to the application server 130 or monitor control device 128. The application server 130 or monitor control device 128 may analyze the motion data and transmit an instruction to the doorbell device 128 to activate.

In some implementations, the doorbell device 128 may be capable of performing one or more response actions to a detected doorbell press to deter possible intruders. For instance, in some examples, the doorbell device 128 can include a speaker that plays a pre-recorded message of the authorized user 104 to indicate that someone is presently within the property 101 even when the property 101 is unoccupied. In other examples, the doorbell device 128 may be capable of transmitting signals to devices within the property 101 (e.g., the sensors 122, the appliances 124, the cameras, 126) in response to detecting a doorbell press to simulate occupancy within the property 101. In other examples, the doorbell device 128 may also communicate directly with the monitor control unit 110, which can then relay the communication with the doorbell device 128 to devices within the property over another signal path using a different communication protocol (e.g., Bluetooth, Bluetooth LE, ZWave, ZigBee, etc.).

In some implementations, the doorbell device 128 may stream live video content to the application server 130. The doorbell device 128 may also upload video clips to the application server 130, video clips may contain video data that was recorded prior to the triggering of the video event. For example, the clip may contain video data from the 10 seconds immediately preceding a doorbell camera button press event.

In some implementations, the doorbell device 128 may analyze videos or images captured of the detectable regions 128*a* for the presence of persons in the captured videos or images. For instance, the doorbell device 128 may use image processing techniques in order to identify shapes in the captured images that resemble a human body near the front door of the property 101 where the doorbell device 128 is located. The doorbell device 128 also may analyze the images for moving objects (or use other techniques to identify moving objects) and target imaging on capture of moving objects. In some implementations where video is being transmitted from the doorbell device 128 to the application server 130, the server may analyze videos or images for the presence of persons, including the use of image processing techniques in order to identify shapes in the captured images that resemble a human body near the front door of the property. Based on detection of the individual 102, the doorbell device 128 may lock onto the location of the individual 102 within the exterior region 128*a* and follow the individual 102 within the exterior region 128*a*. In addition, once the doorbell device 128 locks onto the individual 102, the doorbell device 128 can transmit a signal to the monitor control unit 110 or the application server 130 to coordinate operations between the sensors 122, the appliances 124, and the cameras 126 and gather data collected by these devices to determine a security state associated with the property 101. In implementations where video is being transmitted from the doorbell device 128 to the application server 130, the server may analyze the video data to lock onto the location of the individual 102 follow the individual throughout the field of view.

Upon detection of the individual 102, the doorbell device 128 can also transmit a signal to the monitor control unit 110. For instance, the transmitted signal may include attributes of the individual 102, motion detection data within the exterior region 128*a*, the number of doorbell presses received within a particular time period, and/or a time duration represented by the particular time period. Based on the information included within the transmitted signal, the monitor control unit 110 may determine whether there may be a potential security concern for the property 101 and take action accordingly. For example, metadata associated with the information included within the transmitted signal can be transferred to the application server 130 or a central alarm station server.

In some examples, the doorbell device 128 may perform image recognition processing on the captured videos or images of the exterior region 128*a* in an attempt to detect whether any of the identified individual are authorized users (e.g., users authorized to access the property 101). In these examples, the doorbell device 128 may have access to images of authorized users of the property 101 and may compare images being captured to the accessed images of authorized users. Based on the comparison, the doorbell device 128 may use facial recognition techniques to determine whether the imaged user matches an authorized user 104 of the property 101. The doorbell device 128 may then use the determination of whether the imaged user matches an authorized user 104 of the property 101 or an intruder to control further tracking operation.

For example, based on a determination that the imaged user is an intruder, the doorbell device 128 may continue tracking the intruder and ensure that sufficient videos or images to identify the intruder have been captured. Alternatively, based on a determination that the imaged user is an authorized user, the doorbell device 128 may discontinue tracking the authorized user. The doorbell device 128 also may report the location of the authorized user 104 to the monitor control unit 110.

In other examples, the doorbell device 128 or the monitor control unit 110 can also store a blacklist that specifies a list of known individuals that the authorized user has indicated should not be able to access the property 101. The blacklist may include one or more photos of the known individuals that the integrated that are compared to photos of individuals detected within the detectable region 128*a*. In response to determining that the detected image of an individual within the detectable region 128 matches at least one photograph of an individual within the blacklist, the doorbell device 128 or the monitor control unit 110 can take security measures to restrict access to the property 101. For example, in response to determining that the captured photo of the individual within the detectable region 128*a* matches a photograph of an individual within the blacklist, the monitor control unit 110 can transmit a signal to the application server 130 indicating a potential security risk to the property 101, and an alert with the photograph can then be transmitted to the user 140.

In some implementations, the doorbell device 128 communicates directly with the application server 130 over the Internet. In these implementations, sensor data, including doorbell activation data, and video image data captured by the doorbell device 128 does not pass through the monitor control unit 110 and the doorbell device 128 receives commands related to operation directly from the application server 130.

In some implementations, the doorbell device 128 is managed by the application server 130, including periodic monitoring of the device's basic functionality. Management may also include monitoring the firmware version of the doorbell device 128 and on occasion, updating the firmware version of the device.

In some implementations, the application server 130 will systematically manipulate doorbell device 128 settings to deliver desired end-user functionality such as scheduling. For example, if a user desires to only have the chime function of their doorbell enabled during daytime hours, the application server 130 could be programmed to send commands to the doorbell device 128 to disable the chime functionality on a specified schedule.

The application server 130 is an electronic device configured to provide monitoring services by exchanging electronic communications with the monitor control unit 110 and the user device 140 over the network 105. For example, the application server 130 may be configured to monitor events (e.g., alarm events) generated by the monitor control unit 110. In this example, the application server 130 may exchange electronic communications with the network module included in the monitor control unit 110 to receive information regarding events (e.g., alarm events) detected by the monitor control unit 110. The application server 130 also may receive information regarding events (e.g., alarm events) from the user device 140.

In some implementations, the application server 130 may route alarm data received from the network module or the user device 140 to a central alarm station server that is maintained by a third-party security provider. The alarm data can include captured video footage of the detected individual within the detectable region 128*a*, which is processed by the third-party security provider to request emergency assistance to the property 101. For example, the alarm data can be transmitted to law enforcement so indicate a potential security breach within the property 101. In some instances, the alarm data can also include metadata identified by the doorbell device 128 within the captured video footage (e.g., gender of the individual, suspected identity of the individual, key physical attributes, etc.). In these examples, the alarm data can either be transmitted to law enforcement after requesting confirmation from the user, or automatically transmitted without intervention from the user.

The application server 130 may store sensor and image data received from the monitoring system and perform analysis of sensor and image data received from the monitoring system. Based on the analysis, the application server 130 may communicate with and control aspects of the monitor control unit 110, the user device 140, the cameras 126, or the doorbell device 128.

The user device 140 may be an electronic device associated with a property owner or an occupant that exchange network communications over the network 105. For example, the user device 140 may be smartphones, tablets, personal computers (PCs), network-enabled media players, home entertainment systems, cloud storage devices, and other types of network devices. The user device 140 may access a service made available by the application server 130 on the network 105, such as a mobile application. The data generated by the user device 140 may include over the network 105, which may be monitored by the monitor control unit 110.

The user device 140 can include a native surveillance application. The native surveillance application refers to a software/firmware program running on the corresponding mobile device that enables the user interface and features described throughout. The user device 140 may load or install the native surveillance application based on data received over a network (e.g., the network 105) or data received from local media. The native surveillance application runs on mobile devices platforms. The native surveillance application also enables the user device 140 to receive and process image and sensor data from the monitoring system.

In some implementations, the user device 140 communicate with and receive monitoring system data from the monitor control unit 110 using a communication link. For instance, the user device 140 may communicate with the monitor control unit 110 using various local wireless protocols such as Wi-Fi, Bluetooth, Zwave, Zigbee, HomePlug (Ethernet over powerline), or wired protocols such as Ethernet and USB, to connect the user device 140 to local security and automation equipment. The user device 140 may connect locally to the monitoring system and sensors 122 and other devices. The local connection may improve the speed of status and control communications because communicating through the network 105 with a remote server (e.g., the application server 130) may be significantly slower.

Although the user device 140 are shown as communicating with the application server 130, the user device 140 may also communicate directly with the sensors 122 and other devices controlled by the monitor control unit 110 when the user device 140 is near the property 101. For example, the user device 140 may exchange communications with the devices of the system 100 over the network 105.

In some implementations, the user device 140 receive monitoring system data captured by the monitor control unit 110 through the network 105. The user device 140 may receive the data from the monitor control unit 110 through the network 105 or the application server 130 may relay data received from the monitor control unit 110 to the user device 140 through the network 105. In this regard, the application server 130 may facilitate communication between the user device 140 and the monitoring system.

In some implementations, the system 100 intelligently leverages the monitor control unit 110 to aid in security monitoring, property automation, and property management. For example, the monitor control unit 110 may aid in investigating alarm events detected at the property 101 by the monitor control unit 110. In this example, the monitor control unit 110 may detect an alarm event (e.g., a fire alarm, an entry into the property 101 when the system is armed "Stay," etc.) and, based on the detected alarm event, control the monitor control unit 110 to attempt to identify persons in the property 101 at the time of the alarm event. Specifically, the monitor control unit 110 may send a control command that causes the sensors 122 and the cameras 126 to perform a coordinated and automated search for persons in the property 101. Based on the control command received, each of the cameras 126 captures images of the property 101.

In some examples, the monitor control unit 110 may be assigned to different areas of the property 101 where the monitor control unit 110 can move in an unobstructed manner. In these examples, the monitor control unit 110 may be assigned to different levels in a property (e.g., an upstairs robotic device and a downstairs robotic device) and even different rooms or sections that are potentially blocked by doors. The monitor control unit 110 coordinate tracking movement based on the assigned areas. For instance, the monitor control unit 110 determines areas in a property where an event has been detected (e.g., where motion is sensed, where a door or window is opened, etc.) and only controls the robotic devices assigned to the determined areas to operate. In this regard, the monitor control unit 110 may use location of users determined using the sensors 122 to control operation of the monitor control unit 110.

Examples of implementations of the system 100 can use various types of data captured devices within the property 101 (e.g., the sensors 122, the appliances 124, the cameras 126, and the doorbell device 128) to perform differential actions based on the present conditions of the property 101. In some instances, the application server 130 transmits different notifications of a detected doorbell press based on detecting the identity of the individual 102 that presses the doorbell device 128. For example, the application server 130 may transmit a low priority notification to the user device 140 if the individual 102 is determined to be a known individual (e.g., family member, neighbor, or commonly detected individual etc.) whereas the application server 130 may transmit a high priority notification if the individual 102 is determined to be an unknown individual. In some instances, the priority of the notification can also be based on a classification associated with the detected individual 102 (e.g., service personnel, mail carriers, etc.).

In some instances, the notifications transmitted by the application server 130 may be based on a security status of the property 101 assigned a security system of the property 101. In such instances, the doorbell action repository 132 can specify a subset of users to transmit notifications based on the security status of the property 101. For example, the application server 130 may transmit a notification to all identified users associated with the property 101 in response to the security status indicating a fire, whereas the application server 130 may transmit a notification only to administrator users in response to the security status indicating a breach within the property 101. In other examples, the application server 130 may transmit motion-based alerts if the security status of the property 101 is set to an "alarmed" mode.

In some implementations, the application server 130 can transmit instructions to the monitor control unit 110 to adjust one or more settings associated with the devices within the property 101. For instance, in response to detecting a doorbell press, the monitor control unit 110 may receive instructions to change the indoor temperature, or operate the appliances 124 on or off. In such instances, the particular instructions received by the monitor control unit 110 can be varied based on the identity of the detected individual 102. In other instances, the particular instructions can also be based on other types of information associated with the detected individual 102 (e.g., motion detected within the exterior region 128*a*, time difference between a detected doorbell press and opening the front door of the property 101, etc.).

In some implementations, where the application server 130 transmits notifications to the user device 140, the particular notification transmitted can be based on the location of the user device 140. For example, a notification can be prevented from being transmitted if the user device 140 is near or with the property 101. In other examples, the application server 130 can transmit notifications to another remote user if the user device 140 is located within the property 101.

In some implementations, the application server 130 determines the particular action to be performed in response to a doorbell pressed based on monitoring one or more parameters indicated by the data transmitted from the monitor control unit 110. For instance, as described more particularly with respect to FIG. 2, the doorbell action repository 132 can specify different actions to be performed based on occupancy information gathered by the devices within the property 101, doorbell information gathered by the doorbell device 128, and/or the security status indicated by a security system of the property 101.

FIG. 2 illustrates a diagram of an example of a doorbell action repository 210. The doorbell action repository 210 can be accessed by the applications server 130 in order to determine an appropriate action to be performed in response to receiving data indicating a doorbell press near the property 101. As depicted, the doorbell action repository 210 specifies four different doorbell actions that can be performed by the system 100 in response to detecting a doorbell press at the property 101. In other instances, the doorbell action repository 210 may also specify additional or alternative doorbell actions that are not depicted in FIG. 2.

In the example, occupancy information may be determined based on data collected by the sensors 122, the appliances 124, or the cameras 126. For instance, occupancy sensors located in specific regions of the property 101 can be used to detect patterns of movement that indicate where users can be located at the time of a doorbell press. In addition, video footage from cameras 126 can be used to determine the identities of detected users (e.g., children, adults, guest, etc.).

The doorbell information can be gathered by the doorbell device 128 based on detecting a timestamp associated with when the doorbell of the property 101 was pressed. In addition, in response to detecting a doorbell press, the doorbell device 128 may collect video surveillance of the exterior region 128*a* to determine if there is any motion present. In some instances, the motion detected within the exterior region 128*a* after a doorbell press can be compared with the timestamp of the doorbell press, number of doorbell presses, and/or other additional information collected by the doorbell device 128 to specify particular actions to be performed within the doorbell action repository 210.

The security status can be provided by a security system associated with the property 101. For instance, the security status can be set to "armed" if a user and/or the system 100 has enabled the security system of the property 101 such that an alarm signal may be generated in response to detecting a security breach. In such instances, the security status may be correlated with detected information within the property 101 (e.g., occupancy information or doorbell information) to determine if a doorbell press indicates a security concern within the property 101. For example, the application server 130 can determine to not perform an appropriate action specified by the doorbell action repository 210 in response to detecting a doorbell press if the security status is set to "disarmed." In this example, the security status is used to determine that the property 101 has limited security risk because there may be an event taking place within the property 101 where there may be numerous guests entering the premises.

In the examples depicted in FIG. 2, the doorbell action repository 210 specifies different types of doorbell actions that can be performed in response to a doorbell press. In one example, if the occupancy information indicates that there are no occupants within the property 101, the doorbell information indicates that a doorbell press has occurred, and the security status of the property 101 is armed, the doorbell action repository 210 specifies an action to provide remote notification to a particular property owner (e.g., a husband). In this example, because there are no occupants within the property 101, the notification is only transmitted to one authorized user 104 (e.g., the husband). The system 100 may be capable to leveraging the network 105 to transmit an instruction from the application server 130 to the devices connected to the monitor control unit 110 in order to maximize the likelihood that the authorized user 104 can understand the potential risk and take appropriate action.

In another example, if the occupancy information indicates that a child and wife are both located within the property 101 but that a husband is located outside the property 101, the doorbell action repository 210 instead specifies an action to provide a notification to the wife only using devices inside the property 101. For instance, the notification can be provided on one of the appliances 124 used by the wife (e.g., an alert displayed on a kitchen appliance), a mobile device of the wife, or a home speaker system. In some cases so as not to provide unnecessary alerts, if there's already an adult at home the system may only alert that adult at home and forgo providing alerts to adults that are not at home.

In yet another example, if the occupancy information indicates that only a child is located within the property 101, the doorbell action repository 210 specifies an action to provide remote notifications to both the wife and husband. In this example, because a vulnerable user is alone in the property 101 alone, the potential security risk associated with the doorbell press may be determined to be escalated. The action to be performed thus includes notifications to multiple authorized users (e.g., a husband and a wife) in order to maximize the likelihood that at least one authorized user 104 will receive information indicating the elevated security risk to the vulnerable user that is alone in the property 101. In some implementations, the action may also forgo providing any alert in the home of the doorbell press so that the vulnerable user is not tempted to open the door or may provide an alert through a home speaker system instructing the vulnerable user not to open the door.

In yet another example, multiple different types of doorbell information can be used to determine patterns that indicate security risks to the property 101 when there are no occupants within the property 101. For instance, if the doorbell information indicates that multiple doorbell presses have occurred and there is subsequent motion detected within the detectable regions 128*a* while there are there no occupants with the property 101, the doorbell action repository 210 specifies actions to trigger an alarm at the property 101 and transmit a remote notification to multiple authorized users (e.g., a husband and wife). In this example, data indicating the motion detected long after multiple doorbell presses can be used to predict that a potential robbery may take place within the property 101. For instance, the data may indicate that a delivery person rang the doorbell multiple times and left a package outside the property 101 that is now at risk of being stolen by a person that caused the motion detection.

Figure 3:
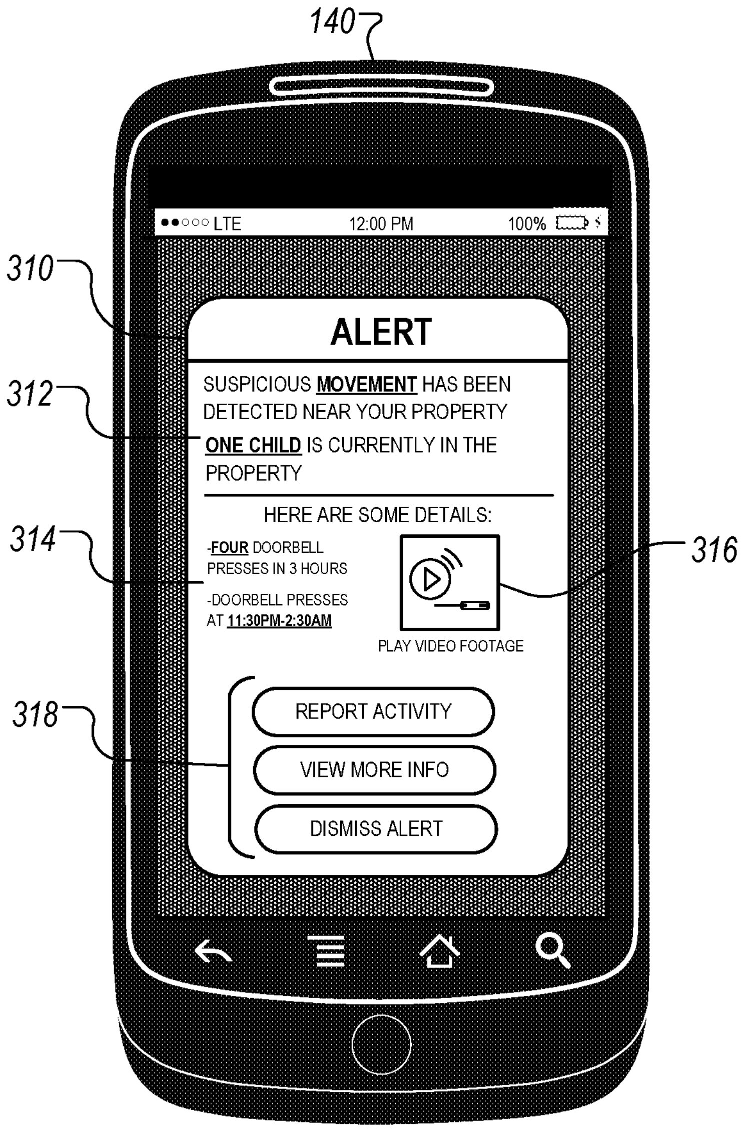
FIG. 3 illustrates a diagram of an example of a doorbell alert provided to a remote user.

FIG. 3 illustrates a diagram of an example of a doorbell alert 310 provided to a remote user. The doorbell alert 310 may indicate occupancy information 312, doorbell information 314, security footage 316, and response options 318. As described previously, the doorbell alert 310 can be transmitted to the user device 140 of the authorized user 104 (e.g., property owner) in response to a doorbell press being detected by the doorbell device 128.

In the example, the doorbell alert 310 is transmitted as a text alert that indicates data gathered the devices within the property 101 (e.g., the sensors 122, the appliances 124, and the cameras 126) and aggregated by the monitor control unit 110. For instance, the doorbell device 128 may determine that motion detected within the exterior region 128*a* is suspicious movement based on analyzing information associated with the motion detected (e.g., time of detection, time period after the initially detecting a doorbell press, number of doorbell presses, types of motion detect, etc.). In addition, as described previously, the occupancy information can be used to determine the types of users that are inside the property 101 (e.g., children, adults, etc.).

In some instances, the various types of occupancy information 312 of the property 101 can be ranked and presented on the doorbell alert 310 based on the specific preferences of the user of the user device 140. For example, different subsets of occupancy information 312 can be displayed on the doorbell alert 310 based on the type of user receiving the doorbell alert 310 (e.g., a wife receiving more occupancy information associated with a child occupancy whereas a husband receiving more occupancy information related to valuable objects inside the property 101).

The doorbell information 314 may include the number of doorbell presses that have been detected within a particular time period and the time frame specified by the time period for the detected doorbell presses. For instance, the doorbell information 314 can be detected by the doorbell device 128 in response to detecting an initial doorbell press near the property 101. In response to detecting the initial door press, the doorbell device 128 may capture video footage of the exterior region 128*a* for the time period associated with the doorbell information 314. In some instances, the security footage 316 may be video footage recorded by a camera associated with the doorbell device 128 that is placed on the exterior of the property 101. In other instances, the security footage 316 may instead be a set of image frames that indicate suspicious visual indicators within the exterior region 128*a*. In such instances, the doorbell device 128 may be capable of using video analytics to perform image recognition techniques to detect the suspicious visual indicators within individual images frames for different time frames.

The response options 318 may provide various options to perform follow-up actions to the user of the user device 140 after receiving the doorbell alert 310. For instance, as depicted, the response options can include reporting the activity included within the doorbell alert 310, viewing additional information collected by devices within the property 101, or dismissing the doorbell alert 310. In this regard, the user of the user device 140 can determine an appropriate response to take based on the information presented on the doorbell alert 310.

Figure 4:
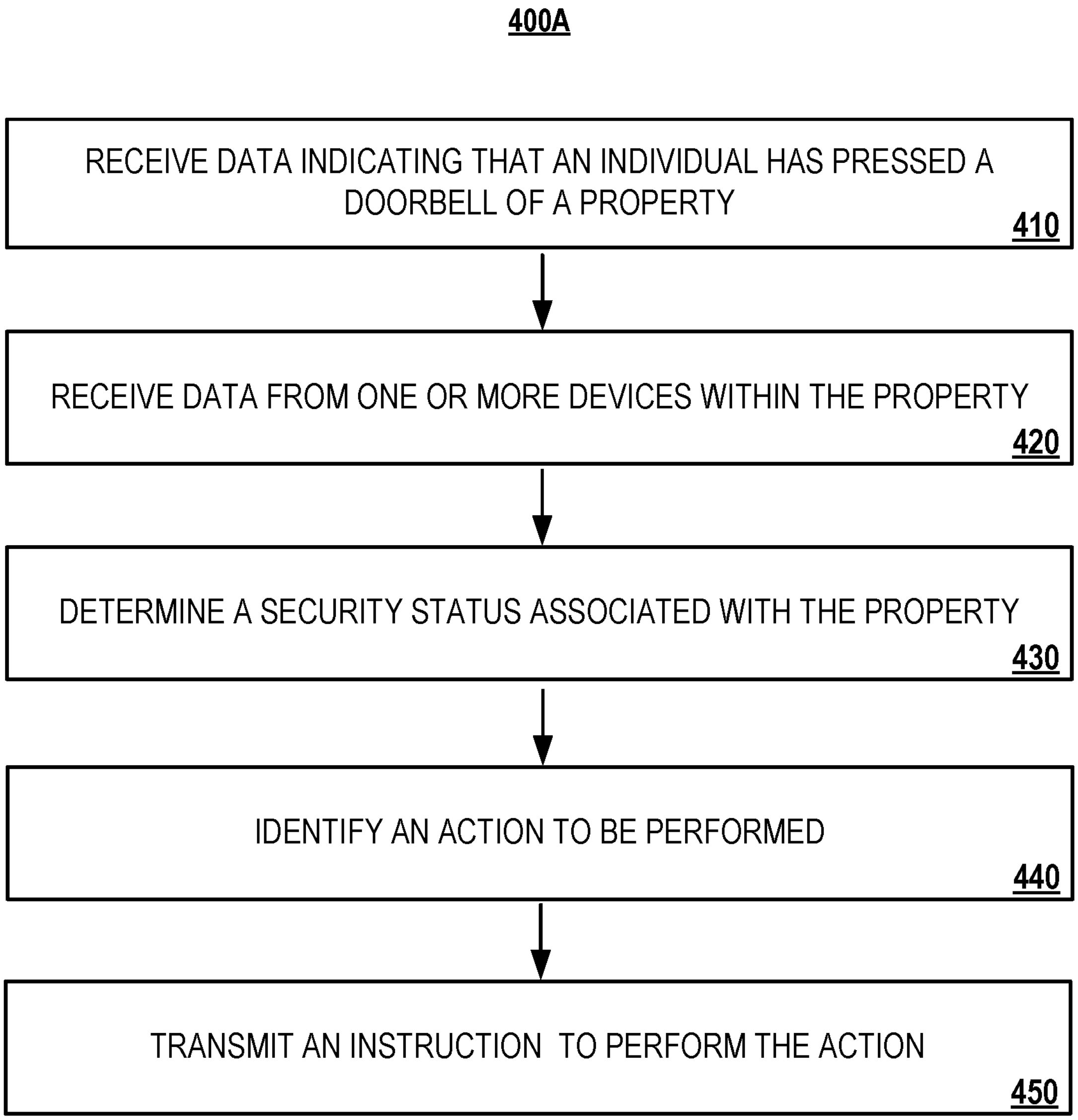
FIG. 4 illustrates an example of a process for determining an action to be performed in response to a doorbell press outside a property.

FIG. 4 illustrates an example of a process 400 for determining an action to be performed in response to a doorbell press outside a property. Briefly, the process 400 may include receiving data indicating that an individual has pressed a doorbell of a property (410), receiving data from one or more devices within the property (420), determining a security status associated with the property (430), identifying an action to be performed (440), and transmitting an instruction to perform the action (450).

In more detail, the process 400 may include receiving data indicating that an individual has pressed a doorbell of a property (410). For instance, the monitor control unit 110 may receive data from the doorbell device 128 indicating that the individual 102 has pressed a doorbell of the property 101. In some instances, the received data can also include security footage of motion detected within the exterior region 128*a*. For example, the data may also indicate information relating to a time difference between a doorbell press and detected motion within the exterior region 128*a* indicating a potential security risk at the property 101.

The process 400 may include receiving data from one or more devices within the property (420). For instance, after receiving the data from the doorbell device 128, the monitor control unit 110 may receive data gathered by the sensors 122, the appliances 124, and the cameras 126. The received data can include, for example, sensor data indicating occupancy information inside the property 101 at the time of the detected doorbell press (e.g., the number and identity of occupants within the property 101) and/or location information of the user device 140 indicating whether an authorized user 104 is presently located within the property 101. In some implementations, the monitor control unit 110 aggregated the received data from the sensors 122, the appliances 124, and the cameras 126 based on using pattern recognition techniques in order to intelligently determine subsets of the received information to transmit to the application server 130.

The process 400 may include determining a security status associated with the property (430). For instance, the monitor control unit 110 may identify a security status associated with a security system of the property 101. The security status may indicate whether the authorized user 104 or a security provider previously armed the security system of the property 101 prior to the detected doorbell press. As described previously, the security status can be used to identify a potential security risk that may be caused by the detected doorbell press given the present conditions of the property 101.

In some implementations, instead of being a dedicated status associated with the security system, the security status may instead be determined by the monitor control unit 110 based on the received data from the sensors 122, the appliances 124, and the cameras 126. For example, the monitor control unit 110 can use an aberrant engine to initially determine if the received data includes information indicating a potential security breach within the interior or exterior of the property 101, and in response, the monitor control unit 110 can designate a security status for the property 101 that indicates the potential security breach.

The process 400 may include identifying an action to be performed (440). For instance, the monitor control unit 110 can initially transmit a data package to the application server 130 that includes doorbell information associated with the detected doorbell press. As described previously, the doorbell information can be based on the data received from the sensors 122, the appliances 124, and the cameras 126. In response, the application server 130 may access the doorbell action repository 132 in order to determine an appropriate action to be performed in response to the detected doorbell press. As described with respect to FIG. 2, the determination of the appropriate action can be based on a set of indicators associated with the present condition of the property 101 at the time of the doorbell press (e.g., occupancy information, doorbell information, security information).

The process 400 may include transmitting an instruction to perform the action (450). For instance, after determining the appropriate action to be performed based on the doorbell action repository 132, the application server 130 may transmit an instruction to perform the appropriate action to the monitor control unit 110. In response, the monitor control unit 110 may transmit a distributed signal to one or more devices within the property 101 to perform the particular action. In some examples, the application server 130 may additionally or alternatively transmit an alert notification to the user device 140 indicating the detected doorbell press at the property 101. As depicted in FIG. 3, the alert notification can display information gathered by the sensors 122, the appliances 124, and the cameras 126 in response to the detected doorbell press.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers of a property monitoring system, the method comprising:

receiving, by the property monitoring system at a first time, doorbell data indicating a doorbell button press, wherein the doorbell data is generated by a doorbell device at a property and received over a wired or wireless network, the doorbell device including a doorbell button and one or more sensors integrated with the doorbell device;

receiving, by the property monitoring system at a second time, integrated sensor data generated by the one or more sensors integrated with the doorbell device, wherein the integrated sensor data is provided to the property monitoring system in response to the doorbell button press, wherein the integrated sensor data represents a first activity detected by the one or more sensors integrated with the doorbell device;

determining that the doorbell data and the integrated sensor data indicate a potential security breach of the property;

in response to determining that the doorbell data and the integrated sensor data indicate a potential security breach of the property, designating a particular security status of the property;

accessing, by the property monitoring system, a data repository implemented on non-volatile memory and storing data representing a plurality of sets of parameters, each set of parameters defining at least one detected activity and associated with a set of designated actions;

selecting, by the property monitoring system and from the data repository, a first set of parameters of the plurality of sets of parameters by matching the first activity detected by the one or more sensors integrated with the doorbell device to the at least one activity associated with the first set of parameters;

selecting, by the property monitoring system and from the set of designated actions associated with the first set of parameters in the data repository, one or more actions to be performed by one or more devices at the property using the doorbell data and the integrated sensor data, wherein the one or more actions are different from second, different actions that would be performed for different doorbell data, different integrated sensor data, or both; and transmitting, by the property monitoring system over the wired or wireless network to the one or more devices at the property, instructions that cause the one or more devices to perform the one or more actions selected from the set of designated actions associated with the first set of parameters, wherein the one or more actions are different from the second, different actions that would be performed for the different doorbell data, the different integrated sensor data, or both.

2. The method of claim 1, wherein the data repository maintains data representing the plurality of sets of parameters, each set of parameters of the plurality of sets of parameters including a security status, the method comprising:

determining a security status of the property monitoring system when the doorbell button press occurred, wherein selecting, from the data repository, the first set of parameters of the plurality of sets of parameters further comprises matching the security status of the property monitoring system when the doorbell button press occurred to the security status included in the first set of parameters.

3. The method of claim 1, wherein the set of designated actions associated with the first set of parameters includes providing a notification of the doorbell button press to a set of electronic devices, the method comprising:

providing, by the property monitoring system and to the set of electronic devices, the notification of the doorbell button press.

4. The method of claim 1, comprising:

analyzing, by the property monitoring system, the integrated sensor data to determine a characteristic of the integrated sensor data generated by the one or more sensors integrated with the doorbell device; and selecting, from the data repository, the first set of parameters of the plurality of sets of parameters based at least in part on matching the characteristic of the integrated sensor data generated by the one or more sensors integrated with the doorbell device to the integrated sensor data characteristic associated with the first set of parameters.

5. The method of claim 1, wherein transmitting, to the one or more devices at the property over the wired or wireless network, instructions that cause the one or more devices to perform the one or more actions comprises:

transmitting an instruction to a camera at the property that causes the camera to stream camera images to the property monitoring system.

6. The method of claim 5, wherein the data repository maintains data representing the plurality of sets of parameters, each set of parameters of the plurality of sets of parameters including an occupancy, the method comprising:

determining, by the property monitoring system and using image processing techniques on the camera images, an occupancy of the property when the doorbell button press occurred; and wherein selecting, by the property monitoring system and from the data repository, the first set of parameters of the plurality of sets of parameters further comprises matching the occupancy of the property when the doorbell button press occurred to the occupancy included in the first set of parameters.

7. The method of claim 1, comprising:

detecting, by the property monitoring system and using the integrated sensor data, an object near the doorbell device, wherein transmitting, to the one or more devices at the property over the wired or wireless network, instructions that cause the one or more devices to perform the one or more actions comprises transmitting, by the property monitoring system, an instruction to the doorbell device to track the object using at least one of the one or more sensors integrated with the doorbell device.

8. The method of claim 1, wherein:

the one or more devices at the property include at least one of a camera, a sensor, a thermostat, a lock, a light, or an appliance, and transmitting, by the property monitoring system over the wired or wireless network to the one or more devices at the property, instructions that cause the one or more devices to perform the one or more actions comprises:

transmitting, to the at least one of the camera, the sensor, the thermostat, the lock, the light, or the appliance, an instruction that changes a setting of the at least one of the camera, the sensor, the thermostat, the lock, the light, or the appliance.

9. The method of claim 1, comprising:

determining that the doorbell data and the integrated sensor data indicate a potential security breach of the property, wherein transmitting, by the property monitoring system over the wired or wireless network to the one or more devices at the property, instructions that cause the one or more devices to perform the one or more actions comprises:

in response to determining that the doorbell data and the integrated sensor data indicate a potential security breach of the property, transmitting, to the one or more devices, an instruction that causes the one or more devices to simulate occupancy within the property.

10. The method of claim 1, wherein selecting, by the property monitoring system and from the set of designated actions associated with the first set of parameters, the one or more actions to be performed by one or more devices at the property comprises:

determining to transmit an instruction to a first device to perform a first action; and determining to skip transmitting an instruction to a second device.

11. The method of claim 1, comprising determining, by the property monitoring system and using the doorbell data, a number of doorbell presses that have occurred, wherein selecting, by the property monitoring system, the one or more actions to be performed by the one or more devices at the property comprises, in response to determining the number of doorbell presses that have occurred, selecting an action of activating an alarm at the property.

12. The method of claim 1, wherein a set of parameters includes:

doorbell information for a doorbell button press event;

occupancy information indicating a property occupancy when the doorbell button press event occurs; and security information indicating a property security status when the doorbell button press event occurs.

13. The method of claim 1, wherein:

a set of parameters comprises three parameters including occupancy information, doorbell information, and a security status; and the plurality of sets comprises four sets.

14. A property monitoring system comprising:

one or more computing devices and one or more storage devices storing instructions that are operable, when executed by the one or more computing devices, to cause the one or more computing devices to perform operations comprising:

receiving, at a first time, doorbell data indicating a doorbell button press, wherein the doorbell data is generated by a doorbell device at a property and received over a wired or wireless network, the doorbell device including a doorbell button and one or more sensors integrated with the doorbell device;

receiving, at a second time, integrated sensor data generated by the one or more sensors integrated with the doorbell device, wherein the integrated sensor data is provided to the property monitoring system in response to the doorbell button press, wherein the integrated sensor data represents a first activity detected by the one or more sensors integrated with the doorbell device;

determining that the doorbell data and the integrated sensor data indicate a potential security breach of the property;

in response to determining that the doorbell data and the integrated sensor data indicate a potential security breach of the property, designating a particular security status of the property;

accessing a data repository implemented on non-volatile memory and storing data representing a plurality of sets of parameters, each set of parameters defining at least one detected activity and associated with a set of designated actions;

selecting, and from the data repository, a first set of parameters of the plurality of sets of parameters by matching the first activity detected by the one or more sensors integrated with the doorbell device to the at least one detected activity associated with the first set of parameters;

selecting, from the set of designated actions associated with the first set of parameters in the data repository, one or more actions to be performed by one or more devices at the property using the doorbell data and the integrated sensor data, wherein the one or more actions are different from second, different actions that would be performed for different doorbell data, different integrated sensor data, or both; and transmitting, over a wired or wireless network to the one or more devices at the property, instructions that cause the one or more devices to perform one or more actions selected from a set of designated actions associated with the first set of parameters, wherein the one or more actions are different from second, different actions that would be performed for different doorbell data, different integrated sensor data, or both.

15. The property monitoring system of claim 14, the operations comprising determining, by the property monitoring system and using the doorbell data, a number of doorbell presses that have occurred, wherein selecting, by the property monitoring system, the one or more actions to be performed by the one or more devices at the property comprises, in response to determining the number of doorbell presses that have occurred, selecting an action of activating an alarm at the property.

16. The property monitoring system of claim 14, wherein a set of parameters includes:

doorbell information for a doorbell button press event;

occupancy information indicating a property occupancy when the doorbell button press event occurs; and security information indicating a property security status when the doorbell button press event occurs.

17. The property monitoring system of claim 14, wherein:

a set of parameters comprises three parameters including occupancy information, doorbell information, and a security status; and the plurality of sets comprises four sets.

18. A non-transitory computer-readable medium storing software comprising instructions executable by one or more computing devices of a property monitoring system which, upon such execution, cause the one or more computing devices to perform operations comprising:

receiving, at a first time, doorbell data indicating a doorbell button press, wherein the doorbell data is generated by a doorbell device at a property and received over a wired or wireless network, the doorbell device including a doorbell button and one or more sensors integrated with the doorbell device;

receiving, at a second time, integrated sensor data generated by the one or more sensors integrated with the doorbell device, wherein the integrated sensor data is provided to the property monitoring system in response to the doorbell button press, wherein the integrated sensor data represents a first activity detected by the one or more sensors integrated with the doorbell device;

determining that the doorbell data and the integrated sensor data indicate a potential security breach of the property;

in response to determining that the doorbell data and the integrated sensor data indicate a potential security breach of the property, designating a particular security status of the property;

accessing a data repository implemented on non-volatile memory and storing data representing a plurality of sets of parameters, each set of parameters associated with at least one detected activity and associated with a set of designated actions;

selecting, from the data repository, a first set of parameters of the plurality of sets of parameters by matching the first activity detected by the one or more sensors integrated with the doorbell device to the at least one detected activity associated with the first set of parameters;

selecting, from the set of designated actions associated with the first set of parameters in the data repository, one or more actions to be performed by one or more devices at the property using the doorbell data and the integrated sensor data, wherein the one or more actions are different from second, different actions that would be performed for different doorbell data, different integrated sensor data, or both; and transmitting, over a wired or wireless network to the one or more devices at the property, instructions that cause the one or more devices to perform the one or more actions selected from the set of designated actions associated with the first set of parameters, wherein the one or more actions are different from the second, different actions that would be performed for the different doorbell data, the different integrated sensor data, or both.

19. The non-transitory computer-readable medium of claim 18, the operations comprising:

determining a characteristic of the integrated sensor data generated by the one or more sensors integrated with the doorbell device; and selecting, from the data repository, the first set of parameters of the plurality of sets of parameters based at least in part on matching the characteristic of the integrated sensor data generated by the one or more sensors integrated with the doorbell device to the integrated sensor data characteristic associated with the first set of parameters.

20. The non-transitory computer-readable medium of claim 18, wherein transmitting, to the one or more devices at the property over the wired or wireless network, instructions that cause the one or more devices to perform the one or more actions comprises:

transmitting an instruction to a camera at the property that causes the camera to stream camera images to the property monitoring system.

* * * * *